E. MORRISON.
Corn Sheller.
No. 15,105.
Patented June 10, 1856.
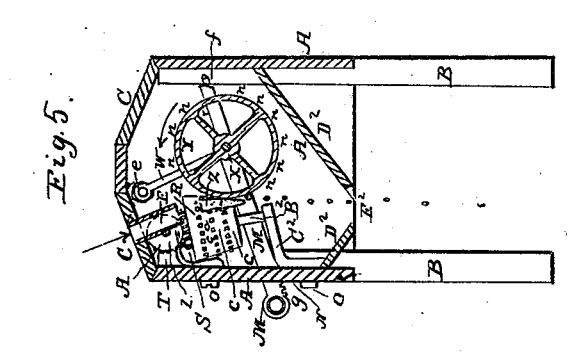
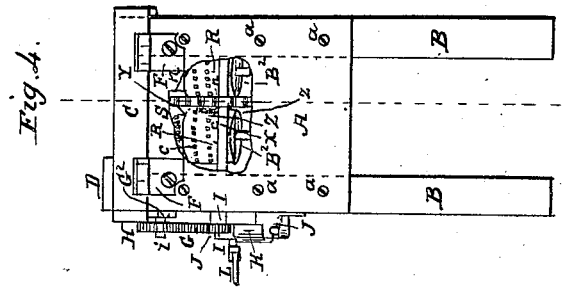
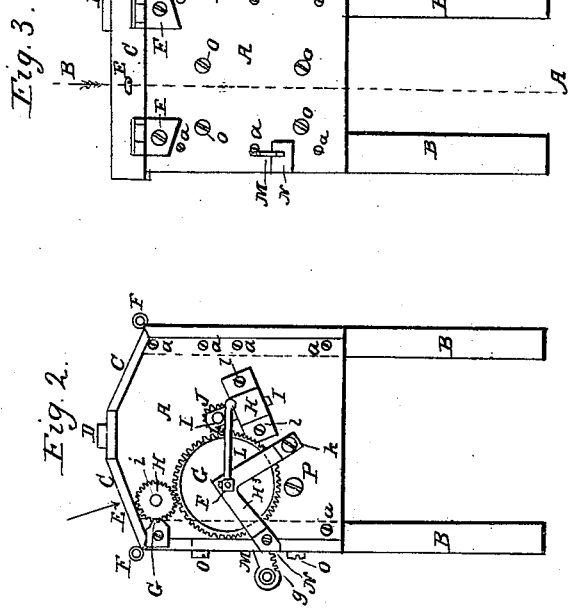
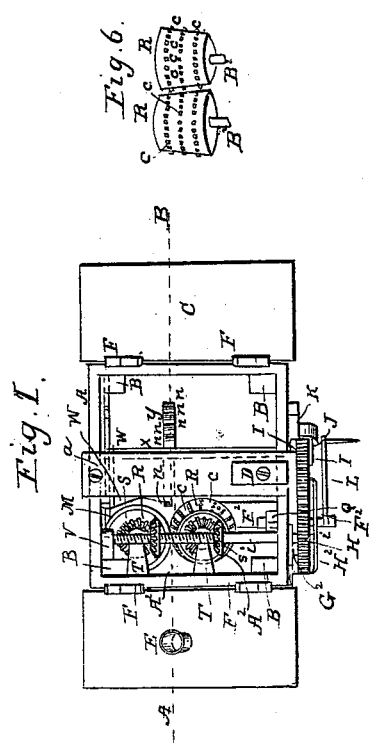

UNITED STATES PATENT OFFICE.

EBENEZER MORRISON, OF FRANKLIN, NEW HAMPSHIRE.

CORN-SHELLER.

Specification of Letters Patent No. 15,105, dated June 10, 1856.

*To all whom it may concern:*

Be it known that I, EBENEZER MORRISON, of Franklin, in the county of Merrimack and State of New Hampshire, have invented a new and useful Improvement in Corn-Shellers; and I hereby declare that the following specification, in connection with the accompanying drawing and references thereon, constitutes a lucid, clear, and exact description of the construction and operation of the same.

In referring to said drawings, Figure 1, denotes a plan or top view; Fig. 2, a side elevation of the same; Fig. 3, a front end view of it; Fig. 4, a back end view; Fig. 5, a longitudinal and vertical section on line A, B, Figs. 1 and 3; Fig. 6 denotes a view of the toothed cylinders or cones disconnected from the machine, to show the angle the ear of corn is fed down when it is being shelled.

*Invention.*—The nature of my invention consists of my machine hereafter described in which I employ two revolving, toothed feed cones, to both feed, and revolve, and move the ears of corn downward, in conjunction with a toothed wheel, revolving so that it effectually shells and removes all the kernels of corn from the cobs while they are so revolved and fed downward; by the turning of a single crank.

*Construction.*—To enable persons skilled in the art to which my invention appertains, to construct and carry out the same, I will describe it as follows:

I construct a strong box of wood seen at A, A, in the several figures of the drawing, which I elevate on four legs of wood seen at B B, B B. To the inside and lower part of the box A, I fit two beveled bottom boards seen at $D^2$, $D^2$, leaving a space between them seen at $E^2$ for the discharge of the corn and cobs, after the corn has been removed or shelled from them. I fit two covers seen at C, C, to the top of the box A, held by the hinges seen at F, F, which are held down by the button D.

To one of the sides of the box A I fit four metallic stands seen T, T, and $C^2$, $C^2$, which are fastened to the box A, by the screws O, O, O, O. To these stands I fit the shafts $B^2$, $B^2$, carrying the two truncated, toothed feed cones or rolls seen at R, R. One of these cones is inverted so as to feed the ears of corn down on a slight angle, and to revolve the ear while being so fed down. The cones R, R, are provided with teeth seen at $c$, $c$, which effectually hold the ears of corn from descending or moving too fast, and as effectually feed down the ears of corn the right speed for the sheller or wheel Y, to remove all the corn from the cob. This shelling wheel Y has a number of teeth formed around its periphery seen at $n$, $n$, which if the wheel Y, be revolved in the direction the arrow points, will press the ears of corn against the teeth of the feed cones R, R, so that they will revolve the ears and feed them down, and allow the shelling wheel Y to remove the corn entirely from the cob.

The feed cylinders R, R, are driven by the bevel gears S, S, which are fastened to the tops of their shafts, and meshing into the two level gears $A^2$, $A^2$, which are fastened to the horizontal shaft $i$ having on its end the gear H which is driven by the drive gear G which is suspended so as to revolve in the stands $H^2$ and Q, these stands being held to the box A, by the screws $k$, $k$, and P, a drive crank seen at L being fitted to the shaft $F^2$ on which the drive gear G is placed.

I construct a stand seen at K which is fastened to the box A by the screws $l$, $l$. To the hole in this stand I fit the swinging step I, which carries one end of the shelling wheel shaft X, and allows it to swing sufficient for moving and adjusting its opposite end to allow the wheel Y in conjunction with the feed cones, to shell any sized ears of corn by means of the swinging arm W, hanging on its center $e$, in which arm one end of the shaft X is suspended and made adjustable by the slide M which has a number of teeth or catches formed on or near its end as seen at $g$ which fit into the edge of a plate seen at N, this plate being firmly fastened to the box A so that if the slide M be raised, that it can be slid either way carrying with it the arm W in which the shelling wheel revolves so as to shell large or small ears of corn, and then let down on to and held by the plate N until another change of it is required and so on as will readily be seen.

A slot seen at $h$, Fig. 5 is formed in the slide M through which a pin passes as seen at $f$ Fig. 5, to prevent this slide from being pulled entirely out of the box A.

The ears of corn seen at Z, Figs. 4 and 5 are fed into my machine through the tube E downward as the arrow points. Soon as it strikes the feed cones R, R, between them and the shelling wheel Y, a rotary motion is imparted to the ear of corn by the revolving of the feed cones and rows of teeth thereon, the angle of the ear, the center being indicated by the red line seen at Fig. 6, being such as to cause the ears of corn in conjunction with the teeth $c$, $c$, and revolving of the cones R, R, to which the teeth $c$, $c$, are affixed, to be fed downward just fast enough to allow the shelling wheel Y to remove all the corn from the cob, and then allow the cob to freely pass out of the machine at the outlet $E^2$ as will readily be seen.

Having thus described my improvement, what I claim as my invention is,

The arrangement of the two, toothed, truncated feed cones R, R for both revolving and feeding down the ears of corn in such manner that the toothed shelling wheel Y will remove all the corn from the cob, during such revolving essentially in the manner and for the purposes set forth.

EBENEZER MORRISON.

Witnesses:
DANIEL OSGOOD,
D. S. GILCHRIST.